United States Patent [19]

Taniguchi

[11] Patent Number: 4,931,861
[45] Date of Patent: Jun. 5, 1990

[54] METHOD OF AND APPARATUS FOR CORRECTING COLOR PATTERN IN MULTICOLOR PROCESS

[75] Inventor: Hisayuki Taniguchi, Kyoto, Japan

[73] Assignee: Dainippon Screen Mfg. Co., Ltd., Japan

[21] Appl. No.: 289,183

[22] Filed: Dec. 23, 1988

[30] Foreign Application Priority Data

Dec. 25, 1987 [JP] Japan ................. 62-326684

[51] Int. Cl.⁵ .............................................. H04N 1/46
[52] U.S. Cl. ........................................ 358/75; 358/77; 358/80; 380/5
[58] Field of Search ................... 358/51, 41, 80, 75, 358/77; 382/25, 48

[56] References Cited

U.S. PATENT DOCUMENTS

| | | | |
|---|---|---|---|
| 3,997,912 | 12/1976 | Zsagar | 358/903 |
| 4,583,116 | 4/1986 | Hennig et al. | 358/78 |
| 4,646,144 | 2/1987 | Ishida et al. | 358/75 |
| 4,734,785 | 3/1988 | Takei et al. | 358/77 |
| 4,772,941 | 9/1988 | Noble | 358/76 |
| 4,777,496 | 10/1988 | Maejima et al. | 358/296 |

*Primary Examiner*—James J. Groody
*Assistant Examiner*—Kimyen Vu
*Attorney, Agent, or Firm*—Ostrolenk, Faber, Gerb & Soffen

[57] ABSTRACT

A multicolor printing process which uses original first and second print patterns for carrying out a print pattern modification process carries out a reduction process by which an overlapping portion of the patterns are reduced to obtain a reduced overlapping portion. A linkage portion is formed between the reduced overlapping portion and a residual portion of the first print pattern. A modified first print pattern is then formed which consists of the residual, linkage, and overlapping portions. The shapes of the original and the generated patterns are expressed by binary data for each pixel of the original print. The shape modification process for obtaining the modified first print pattern is performed through logical processing.

27 Claims, 19 Drawing Sheets

SHAPE EXPANSION

SHAPE REDUCTION

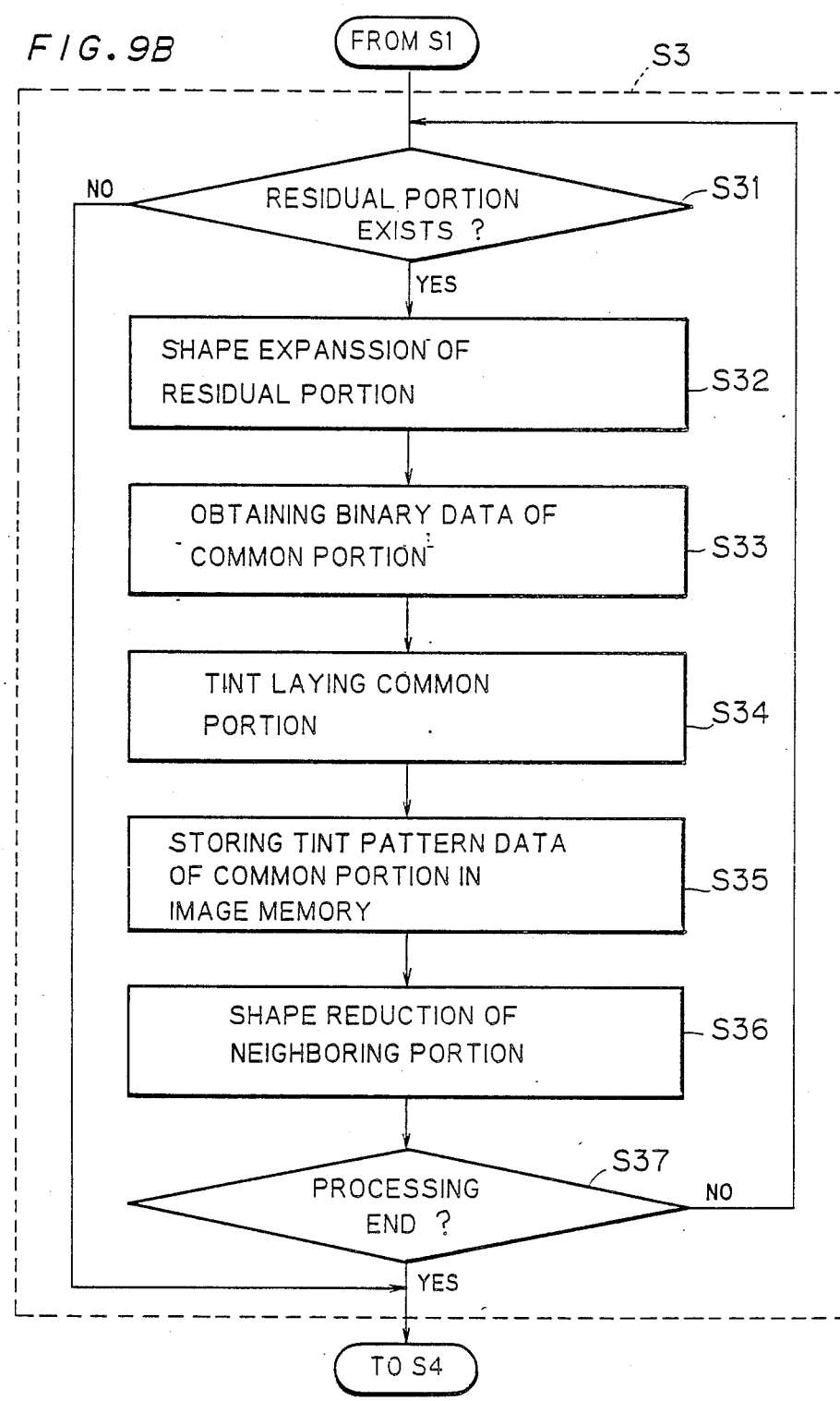

METHOD OF AND APPARATUS FOR CORRECTING COLOR PATTERN IN MULTICOLOR PROCESS

BACKGROUND OF THE INVENTION

1. Field of the Invention

The present invention relates to a method of and an apparatus for correcting color patterns in a multicolor printing process, and more particularly, it relates to a method of and an apparatus for correcting color patterns which are overprinted to produce a multicolor print image, thereby to make color mismatching which arise from printing block registration difficulties.

2. Description of the Prior Art

As well known in the art, a multicolor printing process is performed through overprinting several color images on a same printing paper with blocks of different colors.

As shown in FIG. 1A, for example, when a multicolor image consists of a first region 1 which is printed with a first color ink and a second region 2 which is overprinted with the first color ink and a second color ink, a first block for printing the first color ink, and a second block for the second color ink are produced first. The first block has a first print pattern 3, as shown in FIG. 1B, and the second block has a second print pattern 4. Then, the printing process is performed with the first and second blocks on a same printing paper. In this example, each of the first and second print patterns 3 and 4 is formed as a tint pattern which consists of same halftone dots with same halftone area rates, because the first and second tint patterns 3 and 4 have uniform color densities, respectively. Desirable tones of the respective print patterns are achievable through setting the halftone area rates of the first and second print patterns relative to one another.

In the above process, block registration matching, which means that the first and second print patterns 3 and 4 are overprinted on precise positions of a same printing paper, is at extreme importance. If the registration matching is off, jut regions 3a, 3b and 4a of a single color are formed, as shown in FIG. 1C. This deteriorates the quality of the multicolor image. If the first print pattern 3 is of relatively light density and the second print pattern 4 is of relatively deep density, the jut regions 3a and 3b are conspicuous and the other jet region 4a is not so conspicuous.

In general, the registration mismatch problem is prevented through controlling the dimensions of the print patterns in the block making process and by precisely controlling printing positions of respective print patterns in printing process. However, because registering is performed using edge portion of a printing paper as a base position, the registration mismatch is often caused due to expansion or contraction of the printing paper during a first color print and a second color print, if the printing paper is easy to expand or contract. Such registration mismatch can not be prevented through improving of the printing process or the printing machine.

FIG. 2 illustrates another example of a registration mismatch problem. A third print pattern 8 and a fourth print pattern 9 must contact each other, though an unprinted line region 10 is formed between the third and fourth print patterns 8 and 9 due to the registration mismatch problem. The registration mismatch is also caused by expansion or contraction of the printing paper.

SUMMARY OF THE INVENTION

The present invention is directed to a method and an apparatus therefor for correcting a set of color patterns prepared for an overprinted process, in which the color patterns are overprinted with respective colors so as to produce a multicolor print image, through correcting a set of color pattern data expressing respective shapes and colors of the color patterns, the method comprising the steps of: (a) specifying a first color pattern having a first color to be subjected to shape correction and a second color pattern having a second color not to be subjected to shape correction within the color patterns, (b) binarizing first and second color pattern data expressing respective shapes and colors of the first and second color patterns for each pixel, thereby to obtain first and second binary image data expressing the respective shapes of the first and second color patterns for each pixel, (c) obtaining a third binary image data on the basis of the first and second binary image data, where the third binary image data expresses an overlapping area on which the second color pattern is overlapped with the first color pattern, (d) executing logical processing on the third binary image data, thereby to obtain a fourth binary image data expressing a modified overlapping area which is reduced all around by a prescribed width from the overlapping area, (e) modifying the first color pattern data on the basis of the fourth binary image data, thereby to obtain a modified first color pattern data expressing the modified overlapping area with the first color, and (f) replacing the first color pattern data with the modified first color pattern data, thereby to obtain a set of modified color pattern data which includes the modified first color pattern data in place of the first color pattern data.

According to an aspect of the present invention, the logical processing is performed with a pixel cell consisting of plurality of pixels in a manner that binary data of a central portion of the pixel cell is replaced by a result of logical operation in the pixel cell.

Preferably, a value of the third binary image data is "1" at the inside of the overlapping area and "0" at the outside of the overlapping area, and the logical operation is AND operation among binary data of all pixels included in the pixel cell.

Further, the step (a) may be performed through comparing respective colors of the color patterns with each other, thereby to determine a relatively light color to be the first color and a relatively deep color to be the second color. The step (a) may be also performed by an operator to specify the first and second color patterns regardless of relative deepnesses of the first and second colors.

The present invention is also directed to a method and an apparatus therefor for correcting a set of color patterns prepared for an overprinted process, in which the color patterns are overprinted with respective colors so as to produce a multicolor print image, through correcting a set of color pattern data expressing respective shapes and colors of the color patterns, the method comprising the steps of: (a) specifying a first color pattern having a first color to be subjected to shape correction and a second color pattern having a second color not to be subjected to shape correction within the color patterns, (b) binarizing first and second color pattern data expressing respective shapes and colors of the first and second color patterns for each pixel, thereby to obtain first and second binary image data expressing the respective shapes of the first and second color patterns for each pixel, (c) obtaining third and fourth binary image data on the basis of the first and second binary image data, where the third binary image data expresses an overlapping area on which the second color pattern is overlapped with the first color pattern, (d) executing a first type of logical processing on the third binary image data, thereby to obtain a fourth binary image data expressing a modified overlapping area which is reduced all around by a prescribed width from the overlapping area, (e) obtaining a fifth binary image data on the basis of the third and fourth binary image data, the sixth binary image data expressing a linkage area which is positioned between the residual area and the modified overlapping area, (f) modifying the first color pattern data on the basis of the fifth and sixth binary image data, thereby to obtain a modified first color pattern data expressing a combination of the residual area, the modified overlapping area and the linkage area with the first color, and (g) replacing the first color pattern data with the modified first color pattern data, thereby to obtain a set of modified color pattern data which includes the modified first color pattern data in place of the first color pattern data.

According to another aspect of the present invention, the step (e) further comprises the steps of: (e-1) executing a second type of logical processing on the fourth binary image data to obtain an expanded fourth binary image data expressing an expanded residual area which is expanded all around by a second width from the residual area, (e-2) obtaining a common part binary image data as a part of the sixth binary image data on the basis of the third binary image data and the expanded fourth binary image data, the common part binary image data expressing area which is common to the overlapping area and the expanded residual area, (e-3) executing a third type of logical processing on the third binary image data to obtain a reduced third binary image data expressing a reduced overlapping area which is reduced all around by the second width from the overlapping area, and (e-4) repeating a series of the steps (e-1) through (e-3) by N times, where N is an integer, in which series the fourth binary image data, the residual area, the third binary image data and the overlapping area are assumed to be replaced by the expanded fourth binary image data, the expanded residual area, the reduced third binary image data and the reduced overlapping area, respectively.

Preferably, the second width multiplied by N is the same with the first width. Further, the first, second and third types of logical processing are performed with a pixel cell consisting of plurality of pixels in manners that binary data of a central portion of the pixel cell is replaced by a result of logical operation in the pixel cell. A value of the binary image data may be "1" at the inside of the shapes and areas and "0" at the outside of the shapes and areas. Then, the logical operation in the first and third types of logical processing is AND operation among binary data of all pixels included in the pixel cell, and, the logical operation in the second logical processing is OR operation among binary data of all pixels included in the pixel cell.

Further, the step (a) may be performed through comparing respective colors of the color patterns with each other, thereby to determine a relatively light color to be the first color and a relatively deep color to be the second color. The step (a) may be also performed by an operator to specify the first and second color patterns regardless of relative deepnesses of the first and second colors.

The present invention is further directed to a method and an apparatus therefor for correcting a set of color patterns prepared for an overprinted process, in which the color patterns are printed with respective colors so as to produce a multicolor print image where the respective color patterns are positioned in contact with each other at a border line, through correcting a set of color pattern data expressing respective shapes and colors of the color patterns, the method comprising to steps of: (a) specifying a first color pattern having a first color to be subjected to shape correction and a second color pattern having a second color not to be subjected to shape correction within the color patterns, (b) binarizing first and second color pattern data expressing respective shapes and colors of the first and second color patterns for each pixel, thereby to obtain first and second binary image data expressing the respective shapes of the first and second color patterns for each pixel, (c) obtaining a third binary image data on the basis of the first and second binary image data, the third binary image data expressing an annex area, which width along the border line is decreasing from the border line toward central part of the second color pattern, (d) modifying the first color pattern data on the basis of the third binary image data, thereby to obtain a modified first color pattern data expressing a combination of the shape of the first color pattern and the annex area with the first color, and (e) replacing the first color pattern data with the modified first color pattern data, thereby to obtain a set of modified color pattern data which includes the modified first color pattern data in place of the first color pattern data.

Further, the step (a) may be performed through comparing respective colors of the color patterns with each other, thereby to determine a relatively light color to be the first color and a relatively deep color to be the second color. The step (a) may be also performed by an operator to specify the first and second color patterns regardless of relative deepnesses of the first and second colors.

Accordingly, an object of the present invention is to provide modified print pattern data for forming modified print patterns to make registering mismatch inconspicuous.

Another object of the present invention is to perform the modification of the print pattern data automatically with an image processing apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A–6B, 9A–9B and 11 are flow charts showing the procedure involved in the preferred embodiments.

DESCRIPTION OF THE PREFERRED EMBODIMENTS

Figure 1A:
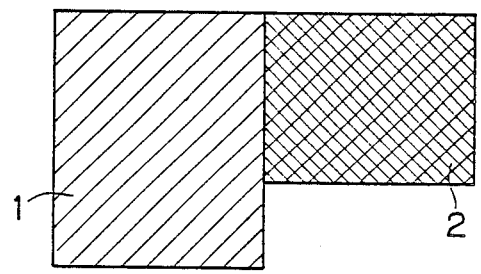
FIGS. 1A-1C and 2 are schematic views of multicolor images obtained by conventional processes.
Figure 1B:
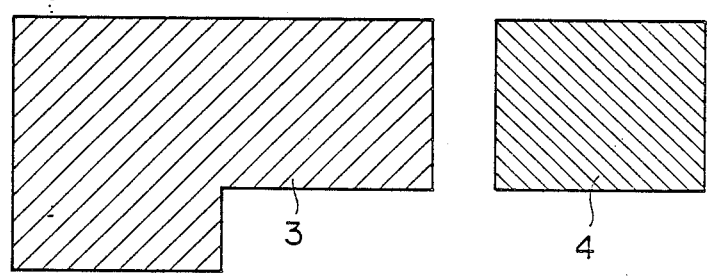
Figure 1C:
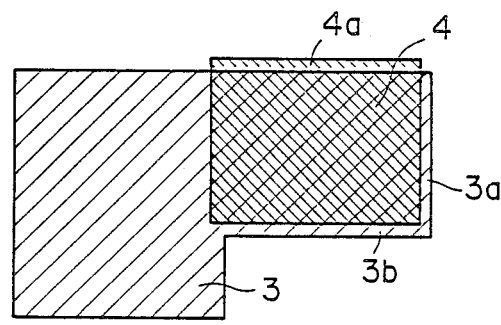
Figure 3A:
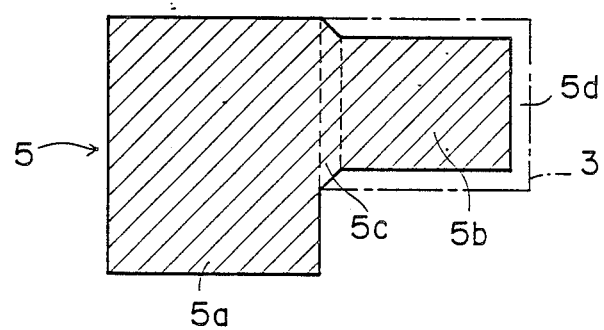
FIGS. 3A-3B are a schematic view of print patterns according to preferred embodiments of the present invention.
Figure 3B:
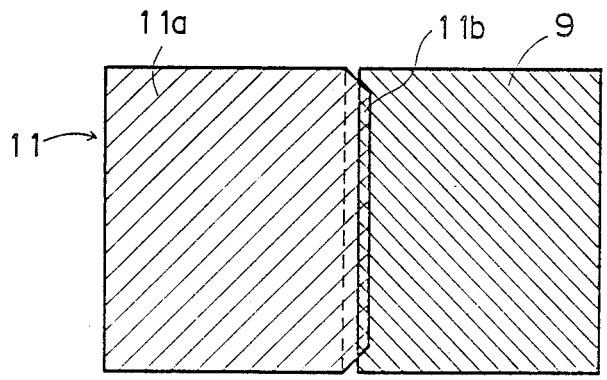

FIGS. 3A and 3B are schematic views of print patterns which are effective to make the registration mismatch problem inconspicuous. FIG. 3A shows a modified first print pattern 5 which is modified from the first print pattern 3 of FIG. 1B. The modified first print pattern 5 consists of first and second rectangular portions 5a and 5b and a trapezoidal linkage portion 5c. The second portion 5b has a reduced area in comparison with a corresponding portion of the first print pattern 3 as shown by dashed lines in FIG. 3A. The linkage portion 5c connects the first and second portion 5a and 5b. Jut regions 3a, 3b and 4a shown in FIG. 1C due to registering mismatch will not here if a multicolor print is reproduced on the basis of the modified first print pattern 5 and the second print pattern 4. The multicolor print thus reproduced has a frame area 5d at the outside of the second region 5b, which frame area 5d is printed only with the second print pattern 4 of the second color ink. However, the frame area 5d is not so conspicuous because the first color of the modified first print pattern 5 is lighter than the second color of the second pattern 4.

Figure 2:
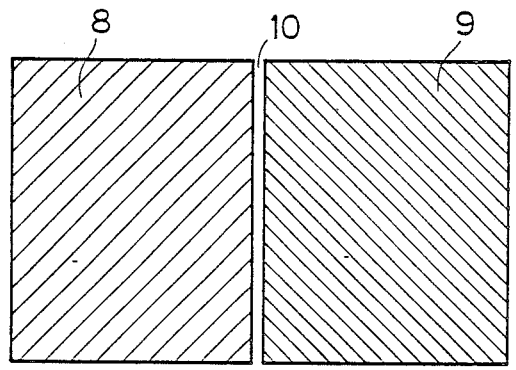

FIG. 3B shows a modified third print pattern 11 which is modified from the third print pattern 8 of FIG. 2. The modified third print pattern 11 consists of a first portion 11a, which is the same as the third print pattern 8, and an annex portion 11b of a trapezoid shape. The annex portion 11b covers the unprinted line region 10 of FIG. 2, thereby preventing image quality deterioration in the multicolor print.

The shape modification of print patterns may be performed by manual modifying of block copies. However, since the manual modification is more difficult when print patterns to be modified have complicated shapes, the cost in production of the block copies is increased.

Preferred embodiments of the present invention are so constructed as to modify print patterns automatically in an image processing apparatus or the like.

Figure 4:
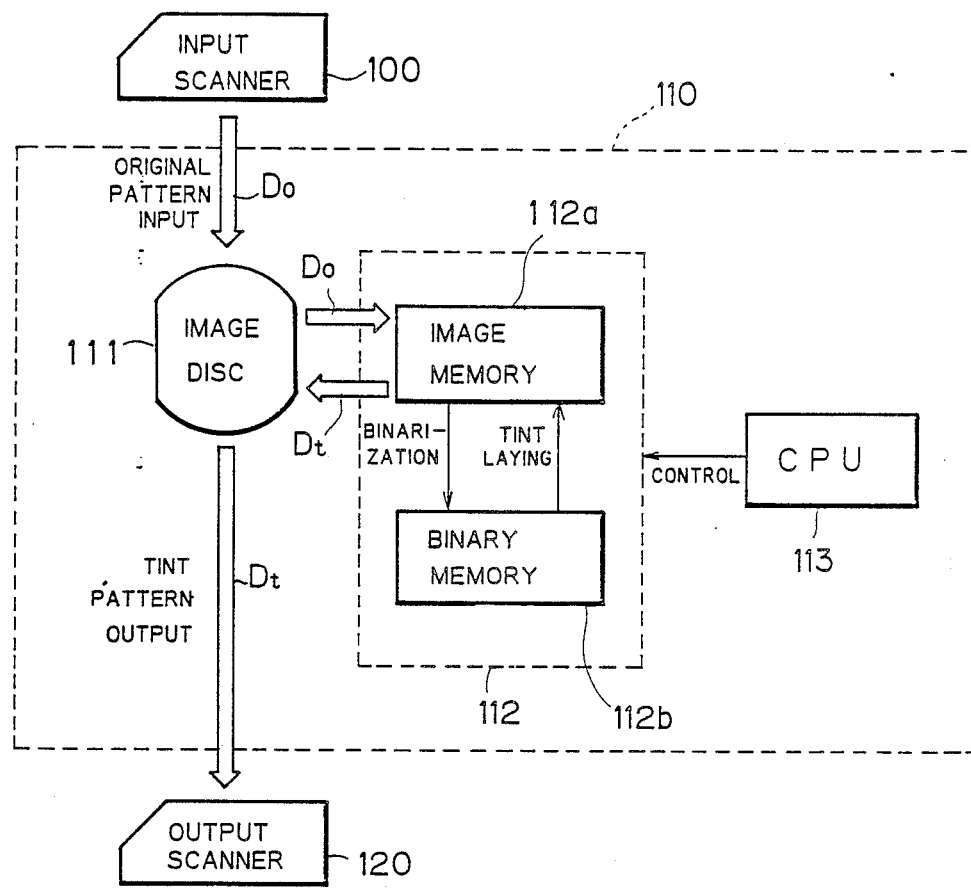
FIG. 4 is a block diagram showing the structure of an image processing apparatus.

FIG. 4 is a block diagram showing the structure of an image processing apparatus. The image processing apparatus 110 comprises an image disc 111, a processing part 112 and a CPU 113. The image processing apparatus 110 first receives original pattern data $D_o$ from an input scanner 100. A variety of apparatuses such as a process scanner, a computer and the like, which generate the original pattern data $D_o$, can be employed in place of the input scanner 100. The original pattern data $D_o$, which expresses respective shapes and color densities of original patterns, is stored in the image disc 111. The original pattern data $D_o$ is then transmitted from the image disc 111 to the processing part 112 to be subjected to data processing for shape modification of the original patterns, thereby to be finally transformed into tint pattern data $D_t$ which expresses modified shapes of the modified original print patterns with prescribed colors. The tint pattern data $D_t$ is transmitted from the processing part 112 to the image disc 111 to be stored therein. The tint pattern data $D_t$ is then outputted from the image disc 111 to an output scanner 120, by which tint patterns having the modified shapes as halftone positives or halftone negatives are recorded.

The processing part 112 comprises an image memory 112a and a binary memory 112b. The image memory 112a temporarily stores some of the original pattern data $D_o$ to be processed in the processing part 112 and the binary memory 112b also temporarily stores binary data obtained through digitization of the original pattern data $D_o$. The shape modification in the processing part 112 is performed under the control by command signals delivered from the CPU 113.

Figure 5A:
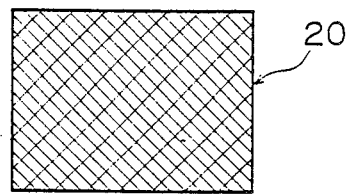
FIGS. 5A-5C, 8A-8G, 10A-10I, 12A-12D and 13A-13B are schematic views of print patterns at main steps of the preferred embodiments of the present invention.
Figure 5B:
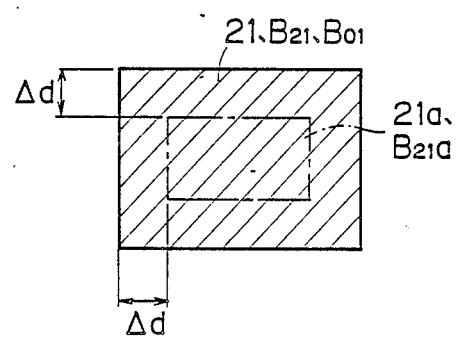
Figure 5C:
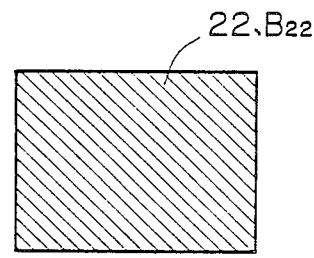
Figure 5D:
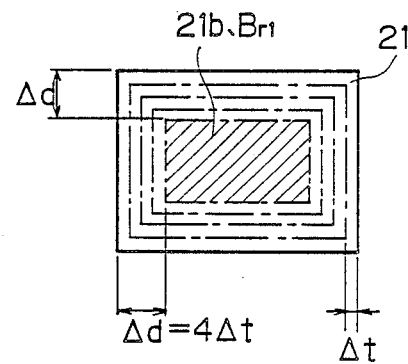

Presently a first method according to the preferred embodiments will be explained in relation to a multicolor image shown in FIGS. 5A–5E, in which original multicolor image 20 is obtained through overprinting of a first print pattern 21 of a first color shown in FIG. 5B and a second print pattern 22 of a second color shown in FIG. 5C. The first and second print patterns have the same shape as the multicolor image 20. A modified first print pattern 21a has a rectangular shape which is reduced by a width $\Delta d$ from the shape of the first print pattern 21. FIGS. 6A–6B are a flow chart showing the procedure for obtaining the modified first print pattern 21a.

First, original print pattern data for both of the first and second print pattern 21 and 22 are inputted from the image disc 111 to the image memory 112a, at step S11. The original print pattern data express the shapes and the densities of respective colors of the first and second print patterns 21 and 22 for each pixel, respectively. For example, the original print pattern data has the form of density data assigned for each pixel.

The original print pattern data of the first and second print pattern 21 and 22 are digitized by the CPU 113 at step S12 by applying a prescribed threshold value criteria. That is, if the density value of a pixel is higher than the threshold value, binary data of the pixel is set at "1", and if the density value is lower than the threshold value, binary data of the pixel is set at "0". The binary data $B_{21}$ and $B_{22}$ for the first and second print pattern 21 and 22 thus obtained only express the shapes of those patterns.

The binary data $B_{21}$ and $B_{22}$ are stored in the binary memory 112b at a step S13, respectively.

Through comparison of the binary data $B_{21}$ and $B_{22}$ with each other, binary data $B_{01}$ of an overlapping portion between the first and second print patterns 21 and 22 is obtained by the CPU 113 at step S14. The overlapping portion is the first print pattern 21 itself in this case. Thus, the binary data $B_{01}$ is stored in the binary memory 112b. If the first print pattern 21 of the first color, which is relatively of light density, includes a residual portion which is not included in the overlapping portion, binary data of the residual portion is also obtained and stored. In the case of FIGS. 5A–5E, the residual portion does not exist.

The steps S11 through S14 are included in a step S1 as preparation steps for the following shape reduction operation in step S2.

At a step S21, it is judged whether an overlapping portion exists. If an overlapping portion does not exist, processing in the processing part 112 is completed and the original pattern data stored in the image memory 112a is returned to the image disc 111 at step S4. If an overlapping portion exists, steps S22 and S23 are repeated to reduce the area of the overlapping portion 21. The width $\Delta d$ to be reduced is preset by an operator. It corresponds to four times a width Δt of a pixel as shown in FIG. 5D in this case. If the reduction of the area of the overlapping portion 21 is performed by the pixel width Δt in each repetition cycle, the steps S22 and S23 are repeated four times to obtain a revised binary data $B_{r1}$ of a reduced area 21b shown in FIG. 5D.

Figure 7A:
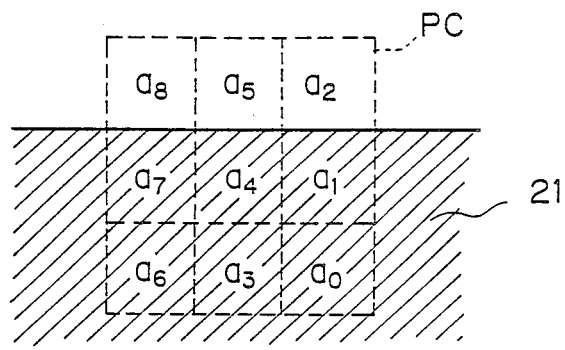
FIGS. 7A–7B are schematic views showing pixel cells.

FIGS. 7A-7D (collectively) provide an explanatory view showing the procedure of reducing or expanding the area of a print pattern. Shaded area in FIG. 7A shows the inside of a print pattern. In a shape reduction operation at step S22, a (3×3) pixel cell PC having nine pixels $a_0$ through $a_8$ is utilized. FIG. 7A corresponds to an initial state where the binary data of the pixels $a_2$, $a_5$ and $a_8$ are "0" and the binary data of the other pixels $a_0$, $a_1$, $a_3$, $a_4$, $a_6$ and $a_7$ are "1". In the shape reduction operation, an AND operation of all the binary data in the pixel cell PC is performed. The binary data $B_{04}$ of the center pixel $a_4$ is replaced by the result of the AND operation as follows:

$$B_{a4} (new) = B_{a0} \cdot B_{a1} \cdot B_{a2} \cdot B_{a3} \cdot B_{a4} \cdot B_{a5} \cdot B_{a6} \cdot B_{a7} \cdot B_{a8} \quad (1)$$

where $B_{a4}$ (new): new binary data of the pixel $a_4$
$B_{a0}$-$B_{a8}$: initial binary data at the pixels $a_0$-$a_8$
".": AND operation In the case of FIG. 7A, the result of the AND operation is "0", and the binary data $B_{a4}$ of the center pixel $a_4$, which is "1" in FIG. 7A, is changed to "0". In each shape reduction operation, the AND operation is repeatedly performed for each case in which each pixel in the overlapping portion 21 is positioned at the center pixel $a_4$ of the pixel cell PC. FIG. 7C shows the result after the shape reduction operation is completed by one cycle, where the area of the overlapping portion 21 is reduced by the pixel width Δt.

The final shape 21b of the reduced overlapping portion is obtained through four cycles of the shape reduction operation, as shown in FIG. 5D. The binary data $B_{r1}$ of the reduced overlapping portion 21b is stored in the binary memory 112b while the binary data $B_{01}$ for the initial overlapping portion 21 is also kept in the binary memory 112b.

Figure 7B:
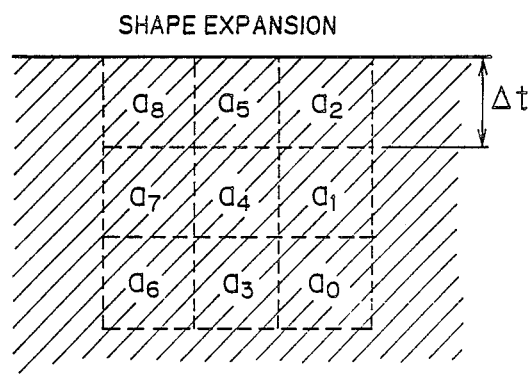
Figure 7C:
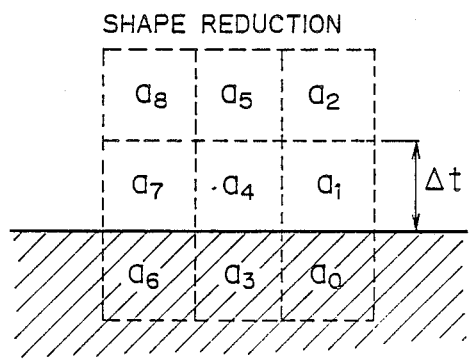

FIG. 7B shows a procedure of a shape expansion operation. The shape expansion operation is employed in another aspect of the present invention, which will be described later. The expansion operation is performed by OR operation of all the binary data in the pixel cell PC. The binary data $B_{a4}$ of the center pixel $a_4$ is replaced by the result of the OR operation as follows:

$$B_{a4} (new) = B_{a0} + B_{a1} + B_{a2} + B_{a3} + B_{a4} + B_{a5} + B_{a6} + B_{a7} + B_{a8} \quad (2)$$

where "+" designates an OR operation.

In the case of FIG. 7A, the result of the OR operation is "1", and the binary data of the center pixel holds "1". When the pixel $a_5$ having the binary data of "0" is set as the center pixel of a pixel cell, the binary data of the pixel is replaced by the value of "1", which is obtained through the OR operation. In every cycle of the shape expansion operation, the OR operation is repeatedly performed for each case in which each pixel in the overlapping portion 21 and each pixel surrounding the overlapping portion 21 is positioned at the center pixel of the pixel cell PC. FIG. 7B shows the result after the shape expansion operation is completed by one cycle, where the area of the overlapping portion 21 is increased by the pixel width Δt.

Figure 7D:
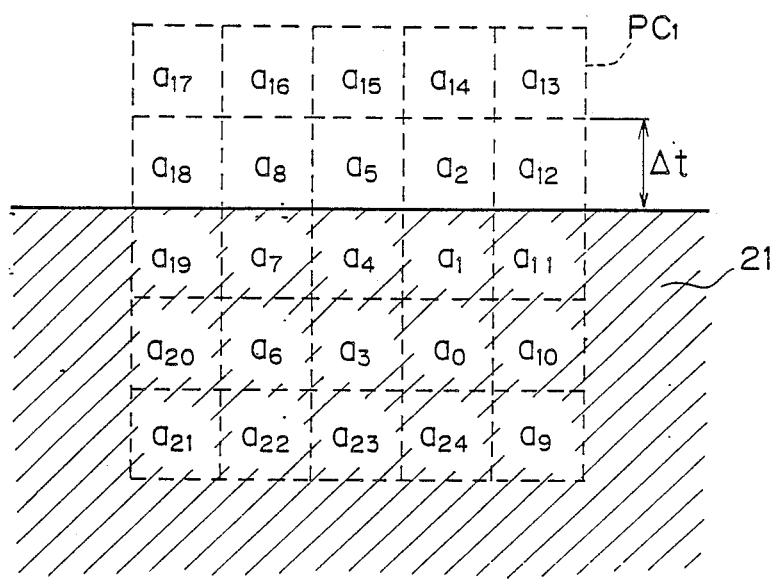

A pixel cell including more than nine pixels can be employed in the shape reduction and shape expansion operation. FIG. 7D shows a (5×5) pixel cell $PC_1$, for example. Shape reduction is performed through the following AND operation:

$$B_{a4} (new) = B_{a0} \cdot B_{a1} \cdot B_{a2} \cdot \ldots \cdot B_{a23} \cdot B_{a24} \quad (3)$$

The AND operation according to the equation (3) is repeatedly performed for each case in which each pixel in the overlapping portion 21 is positioned at the center pixel $a_4$ of the pixel cell $PC_1$. As a result, the area of the overlapping portion 21 is reduced by twice the pixel width Δt in each repetition cycle, and the time required for the shape reduction operation is reduced to a half of that in the case of the (3×3) pixel cell PC accordingly.

Shape expansion operation using the (5×5) pixel cell $PC_1$ is performed according to the following equation:

$$B_{a4} (new) = B_{a0} + B_{a1} + B_{a2} + \ldots + B_{a23} + B_{a24} \quad (4)$$

Figure 5E:
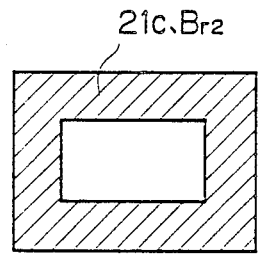
Figure 6A:
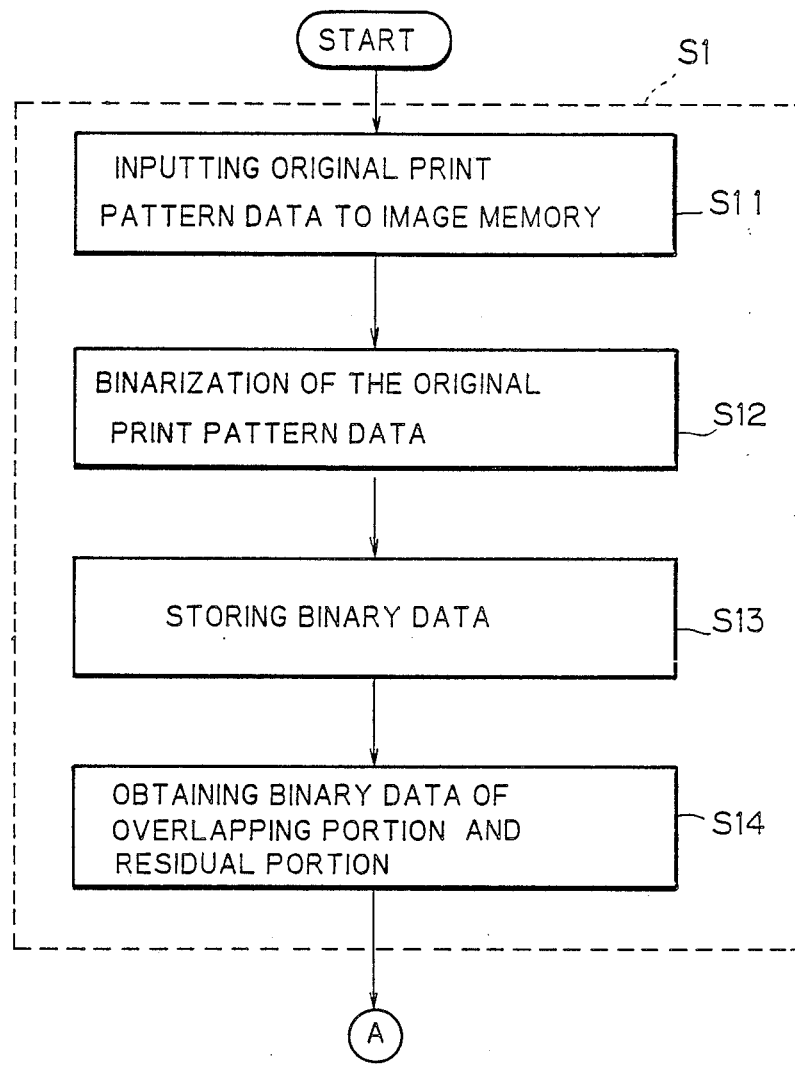
Figure 6B:
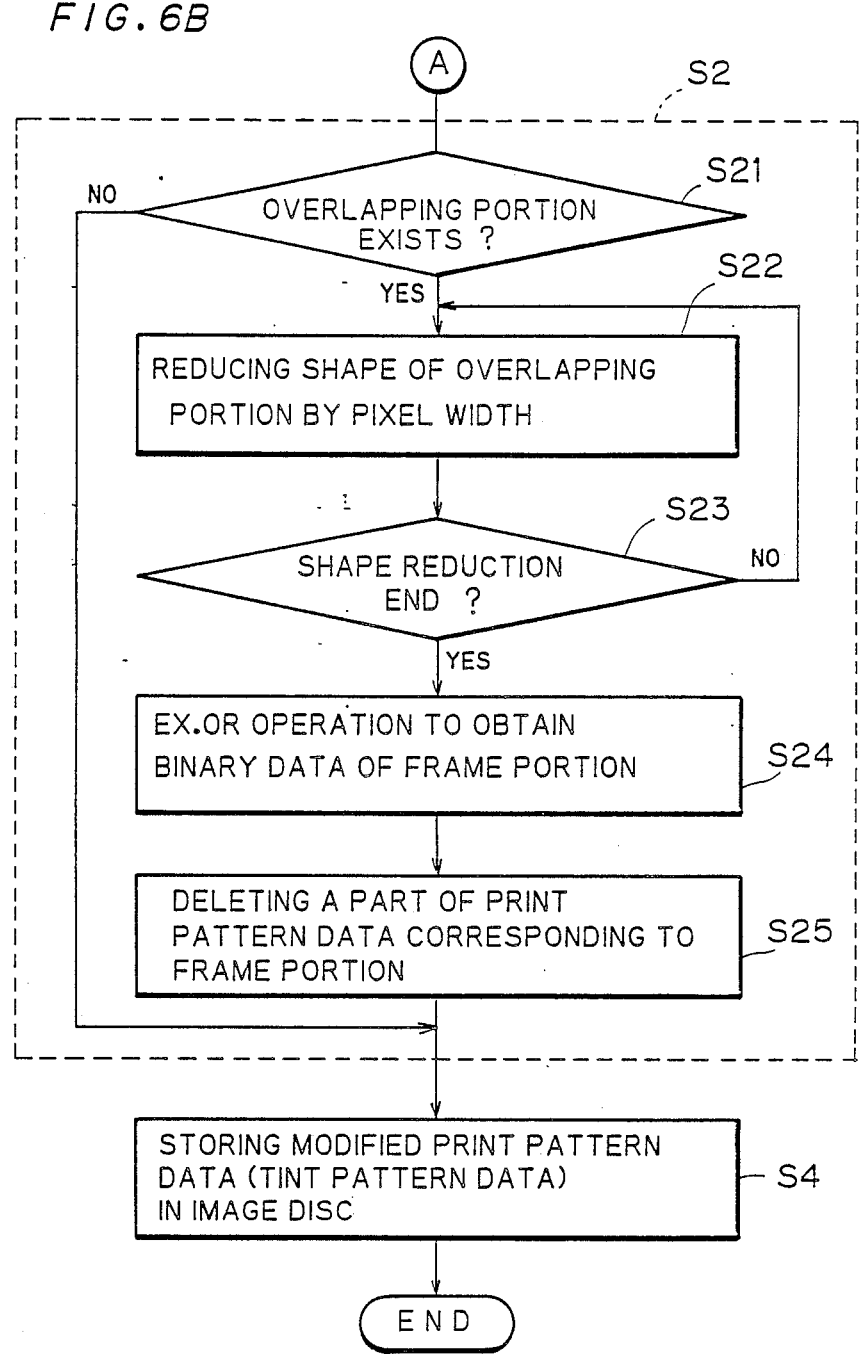

After the shape reduction operation at the steps S22 and S23, an exclusive OR operation is performed between the binary data $B_{01}$ of the initial overlapping portion 21 and the binary data $B_{r1}$ of the reduced overlapping portion 21b at a step S24, thereby to obtain binary data $B_{r2}$ expressing the shape of a frame portion 21c shown in FIG. 5E.

At a step S25, a part of the original print pattern data corresponding to the frame portion 21c, which is stored in the image memory 112a, is deleted, thereby obtaining modified print pattern data $B_{21a}$ of the modified print pattern 21a of FIG. 5B. The modified print pattern data $B_{21a}$ is then stored in the image disc 111.

Although the steps S24 and S25 look much too complicated for obtaining modified print pattern data $B_{21a}$ of the modified print pattern 21a, which has the same shape with the reduced overlapping portion 21b, those steps are necessary in another case as described after.

As described above, only the first print pattern 21 of the first color, which is of relatively light density, is subjected to shape correction and the second print pattern 22 is left intact. This is the same in all of the examples according to the preferred embodiments. However, a first color of a first print pattern is not necessarily lighter than a second of a second print pattern. For example, an operator may specify a first print pattern to be subjected to shape correction and a second print pattern not to be subjected to shape correction regardless of relative deepnesses of their colors.

Figure 8A:
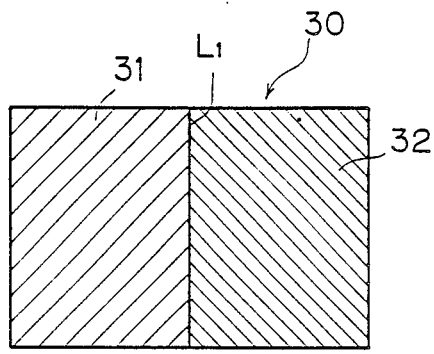
Figure 8B:
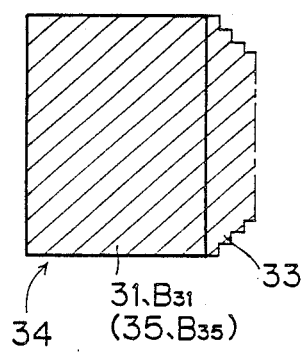
Figure 8C:
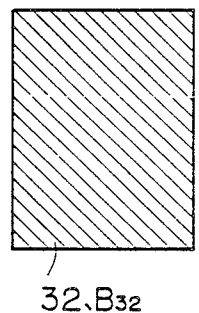

A second example according to the preferred embodiment will be explained as to a multicolor image handling process shown in FIGS. 8A-8G. The original multicolor image 30 shown in FIG. 8A is printed with a first print pattern 31 of a first color shown in FIG. 8B and a second print pattern 32 of a second color shown in FIG. 8C. The first and second print patterns 31 and 32 contact each other at a border line $L_1$. In this case, a modified first print pattern 34 to be obtained consists of the first print pattern 31 and an annex portion 33.

Figure 9A:
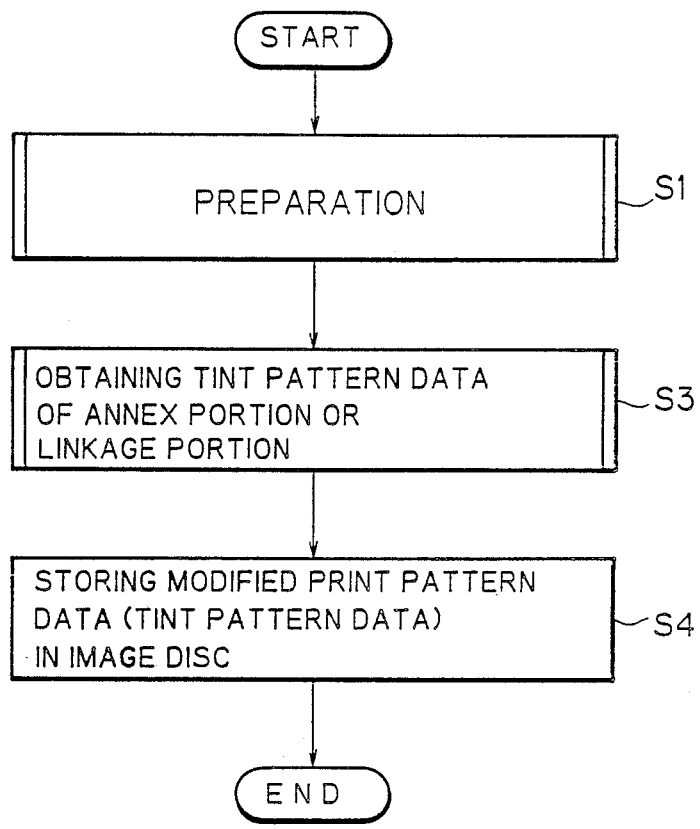

FIGS. 9A-9B collectively present a flow chart showing the procedure for obtaining the modified first print pattern 34.

First, the preparation step S1 shown in FIG. 6A is performed. In the case of FIGS. 8A-8G, there are obtained binary data $B_{31}$, $B_{32}$ and $B_{35}$ for the first print pattern 31, the second print pattern 32 and a residual portion 35 of the first print pattern 31, respectively. The residual portion 35 has the same shape as the first print pattern 31 because an overlapping portion does not exist in the same.

FIGS. 8D through 8G schematically show the procedure to obtain tint pattern data of the annex portion 33, which procedure is shown as a step S3 in FIG. 9B.

At step S31, it is judged whether a residual portion exists. If a residual portion does not exist, all the processing of the step S3 is ended and the original print pattern data of the first print pattern 31 stored in the image memory 112a is returned to the image disc 111 at the step S4. If a residual portion exists, the following steps are carried out.

Figure 8D:
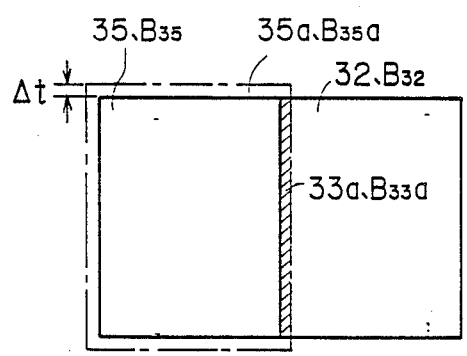

At step S32, shape expansion operation is performed on the residual portion 35 to obtain once-expanded residual portion 35a shown in FIG. 8D. The shape expansion operation is performed as shown in FIG. 7A and 7B. That is, the binary data $B_{35}$ of the residual portion 35 is subjected to the OR operation using the pixel cell PC, thereby to obtain binary data $B_{35a}$ of a once-expanded residual portion 35a. The expansion width is the same as the pixel width $\Delta t$.

Then, binary data $B_{33a}$ of a first common portion 33a which corresponds to a common area to the once-expanded residual portion 35a and the second print pattern 32 is obtained through AND operation between binary data $B_{35a}$ and $B_{32}$ at a step S33. In this case, the second print pattern 32 will be referred to as "neighboring portion" because it neighbors the residual portion 35.

On the basis of the binary data $B_{33a}$ of the first common portion 33a thus obtained, tint pattern data of the first common portion 33a is formed such that value of prescribed halftone area rate is given in each pixel in the first common portion 33a (step S34).

The tint pattern data is stored in the image memory 112a at step S35.

Figure 8E:
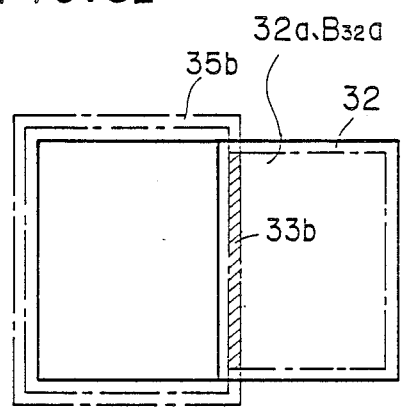

At step S36, the shape reduction operation shown in FIGS. 7A and 7B is performed on the neighboring portion 32, thereby to obtain binary data $B_{32a}$ of a once-reduced neighboring portion 32a shown in FIG. 8E.

After returning to step S31 through step S37, a twice-expanded residual portion 35b is obtained at the step S32. Then tint pattern data of a second common portion 33b shown in FIG. 8E is obtained and stored at the steps S33 through S35 on the basis of the twice-expanded residual portion 35b and the once-expanded neighboring portion 32a.

Figure 8F:
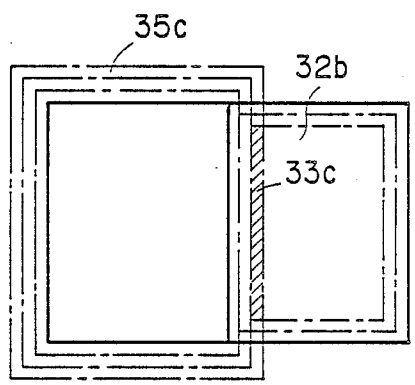
Figure 8G:
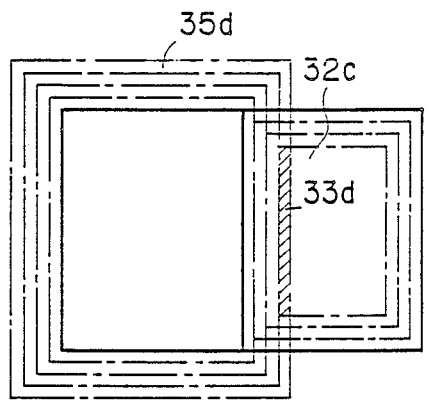

Tint pattern data of third and fourth common portions 33c 33d shown in FIGS. 8F and 8G and are obtained through repeating steps S31 through S37. Namely, steps S31 through S37 are repeated four times. After step S3 (S31–S37), tint pattern data of the modified first print pattern 34 shown in FIG. 8B has been stored in the image memory 112b, because tint pattern data of the annex portion 33 has been formed with those of the first through fourth common portions 33a–33d.

At step S4, tint pattern data of the modified first print pattern 34 is stored in the image disc 111.

Figure 10A:
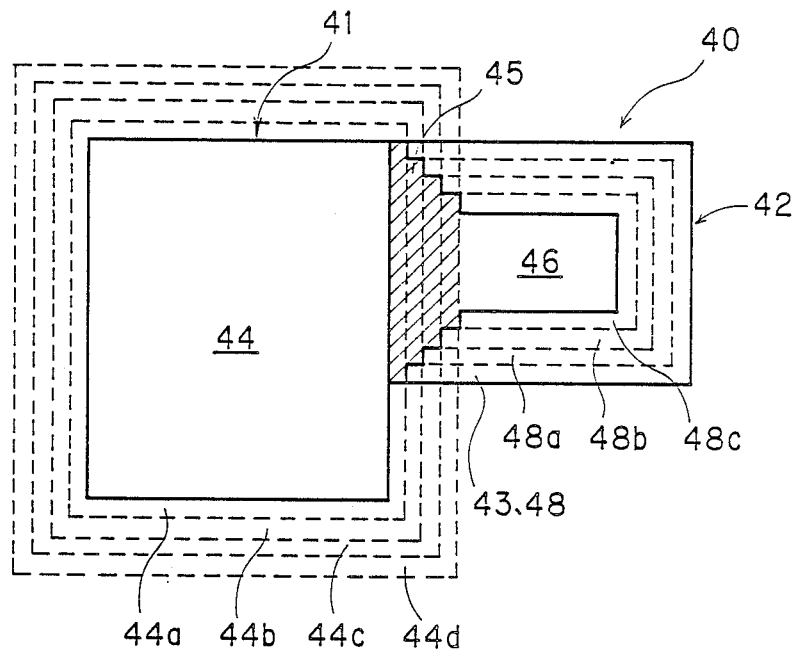
Figure 10B:
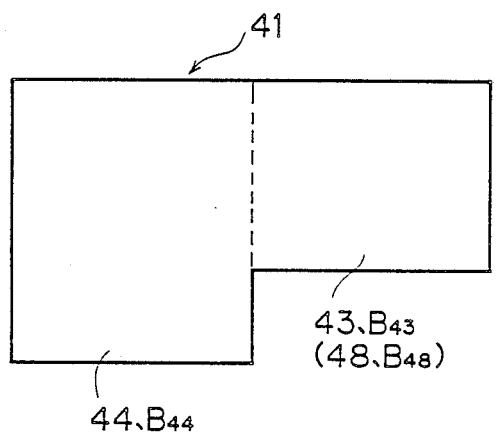
Figure 10C:
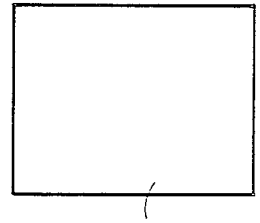
Figure 10D:
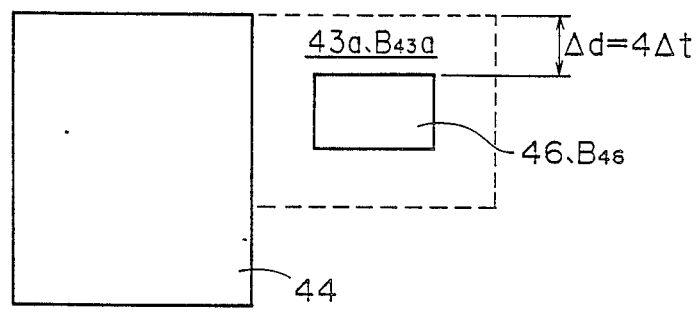
Figure 10E:
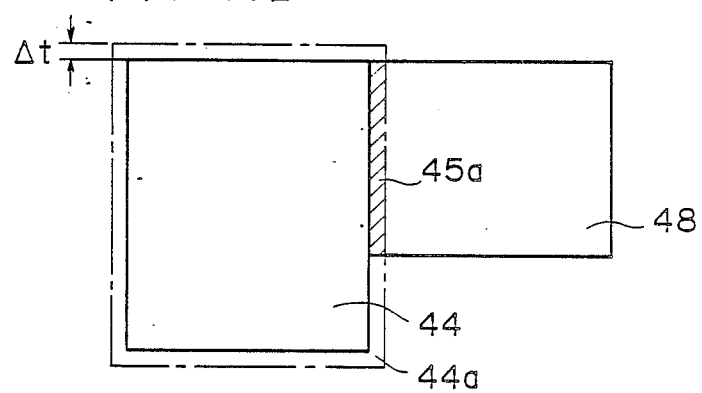
Figure 10F:
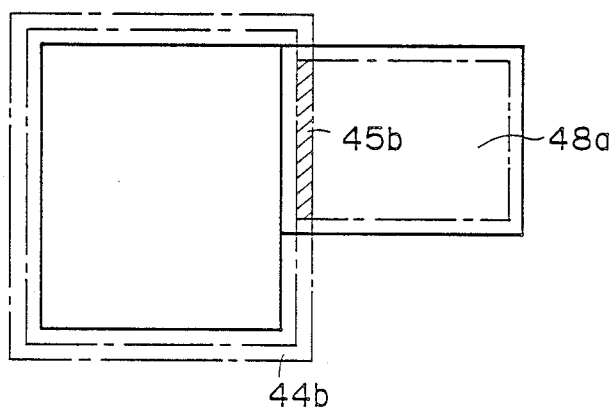
Figure 10G:
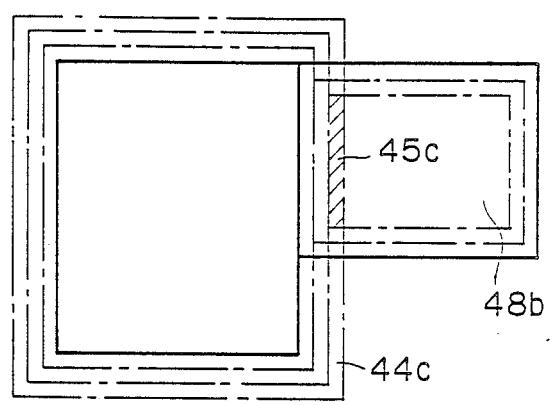
Figure 10H:
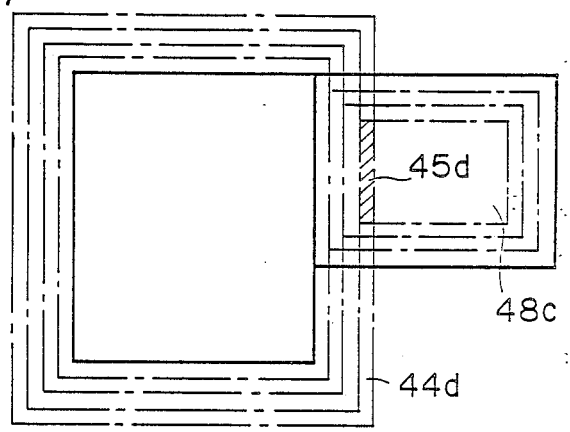
Figure 10I:
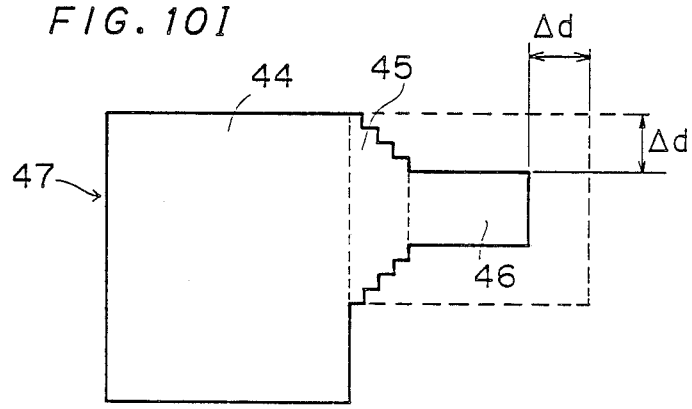

FIGS. 10A–10I present a schematic view of multicolor processing of images by a third method according to the preferred embodiment. The third method is constructed as a combination of the first and second methods described before. An original multicolor image 40 shown in FIG. 10A is obtained by overprinting a first print pattern 41 shown in FIG. 10B and a second print pattern 42 shown in FIG. 10C. The first print pattern 41 is of a first color, which is of relatively light density, and the second print pattern 42 is of a second color, which is of relatively deep density. The first print pattern 41 is divided into an overlapping portion 43 which has the same shape as that of the second print pattern 42, and a residual portion 44. As shown in FIGS. 10A and 10I, a modified first print pattern 47 to be obtained consists of the residual portion 44, a linkage portion 45 and a reduced overlapping portion 46.

Figure 11:
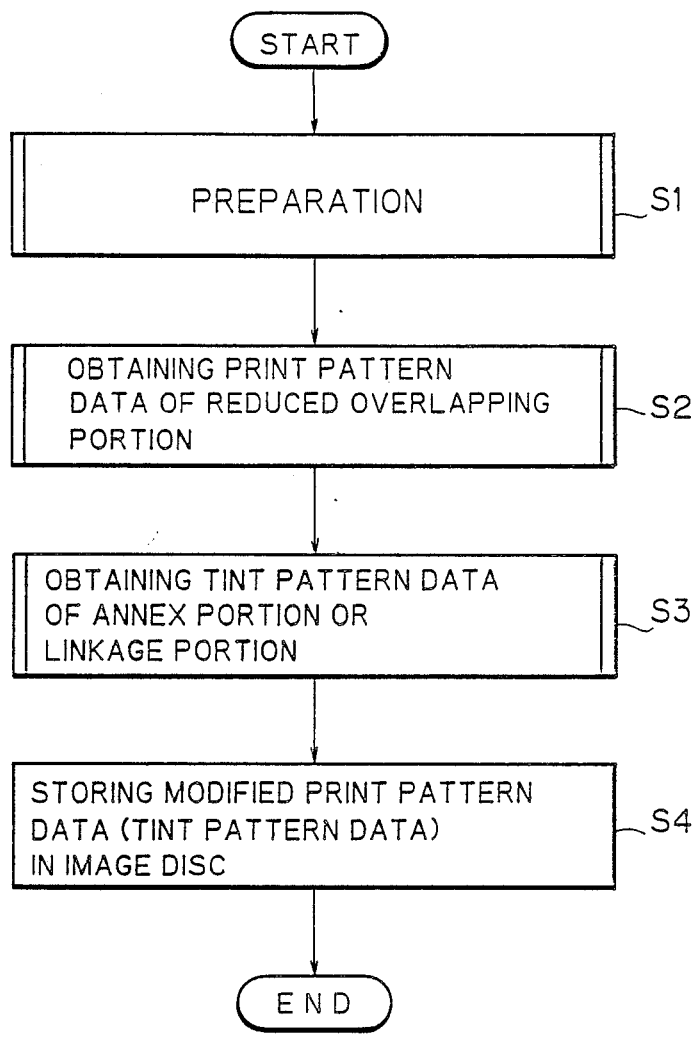

FIG. 11 is a flow chart showing the procedure of obtaining modified print pattern data of the modified first print pattern 47.

At the step S1, which is described in FIG. 6A, the following binary data $B_{43}$, $B_{44}$ and $B_{48}$ are prepared:

I. $B_{43}$ for the overlapping portion 43,
II. $B_{44}$ for the residual portion 44, and
III. $B_{48}$ for a neighboring portion 48.

The neighboring portion 48 is defined to have the same shape as that of the overlapping portion 43 if an overlapping portion exists, or the same shape as that of the second print pattern 42 if an overlapping portion does not exist. In the case of FIG. 10 where the overlapping portion 43 exists, the neighboring portion 48 is defined to have the same shape as that of the overlapping portion 43. In contrast, in the case of FIGS. 8A–8G where no overlapping portion exists, the neighboring portion is defined to have the same shape as that of the second print pattern 32.

Then, the shape reduction operation is performed on the overlapping portion 43 at step S2, which is the same as that shown in FIG. 6B, whereby print pattern data of the reduced overlapping portion 46 is obtained as shown in FIG. 10D. Binary data $B_{43a}$ of a frame portion 43a is obtained on the basis of the binary data $B_{43}$ of the overlapping portion 43 and binary data $B_{46}$ of the reduced overlapping portion 46 at steps S22 through S24. Then a part of the print pattern data of the first print pattern 41 corresponding to the frame portion 43a, which is stored in the image memory 112a, is deleted at step S24. A width $\Delta d$ of the frame portion 43a is the same with the result of the pixel with $\Delta t$ multiplied by four, because steps S22 and S23 are repeated four times. As a result, print pattern data of the first color expresses a combination of the residual portion 44 and the reduced overlapping portion 46 as shown in FIG. 10D.

Then, at step S3, which is shown in FIG. 9B, the linkage portion 45 is obtained on the basis of binary data of the residual portion 44 and the neighboring portion 48. Namely, steps S31 through S37 are repeated four times to obtain four common portions 45a through 45d as shown in FIGS. 10E through 10H, respectively. The linkage portion 45 is composed of the common portions 45a through 45d. As a result, the width of the linkage portion 45 becomes the same as that of the frame portion 43a, whereby the possibility that these portions are separated from each other with a blank space between them is prevented. For this purpose, when the steps S22 and S23 are repeated N times, where N is an integer, steps S31 through S37 are also repeated N times. As can be seen through comparison between FIGS. 8A–8G and FIGS. 10A–10I, the linkage portion 45 has the same function as the annex portion 33.

After step S3, tint pattern data of the modified first print pattern 47 shown in FIG. 10I, which consists of the residual portion 44, the linkage portion 45 and the reduced overlapping portion 46, with have been stored in the image memory 112a. The tint pattern data of the modified first print pattern 47 is then stored into the image disc 111 at step S4.

Figure 12A:
Figure 12B:
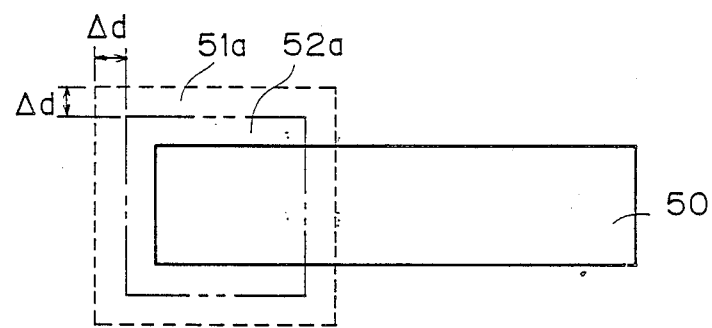
Figure 12C:
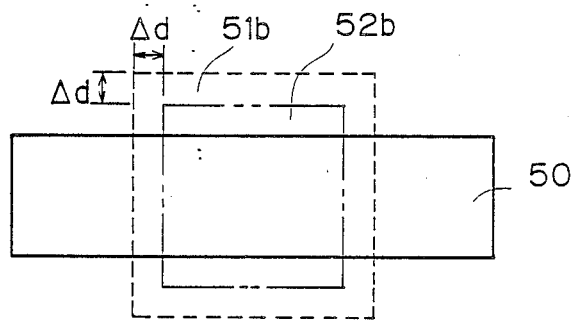
Figure 12D:
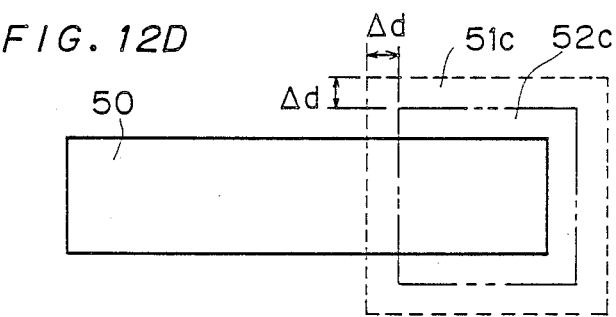

In the above embodiments, it is assumed that the image memory 112a has enough capacity to store all of the print pattern data which is necessary for the shape modification. However, the capacity of the image memory 112 may be relatively small so that it can store only a part of the print pattern data. FIGS. 12A–12D schematically show data processing applied to such a case. It is assumed that all of print pattern data of a print pattern 50 cannot be stored in the image memory 112a together. First, a first image area 51a is so set as to include a part of the first print pattern 50. Print pattern data of the first image area 51a shown in FIG. 12B is stored in the image memory 112a to be subjected to the shape modification in the processing part 112. After the shape modification, tint pattern data of a first effective area 52a is obtained and stored into the image disc 111 from the image memory 112a. The first effective area 52a has a shape which is smaller by the reduction width $\Delta d$ than that of the first image area 51a all around. Then, a second image area 51b is set as shown in FIG. 12C. Print pattern data of the second image area 51b is subjected to the shape modification and tint pattern data of a second effective area 52b is obtained and stored in the image disc 111. The second effective area 52b also has a shape which is smaller by the reduction width $\Delta t$ than that of the first image area 51a all around. The second image area 51b is so set that the second effective area 52b contacts the first effective area 52a. A third image area 51c and a third effective area 52c is also set in the same way as the second image area 51b and the second effective area 52b. As a result, tint pattern data of a modified pattern obtained on the first print pattern 50 is composed of that of the first, second and third effective areas 52a, 52b and 52c. If a first print pattern 50 is much larger than that shown in FIG. 12A, image areas are so set two dimensionally that effective areas come in contact with their respective neighboring effective areas.

Figure 13A:
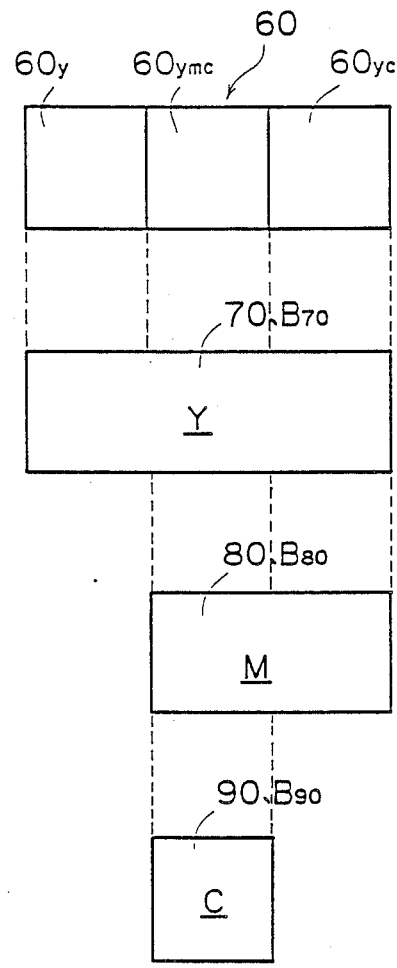
Figure 13B:
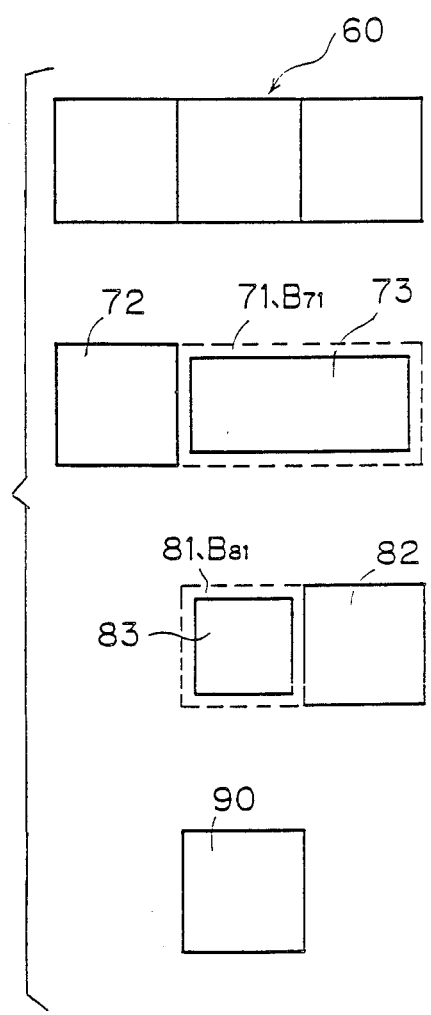
Figure 13C:
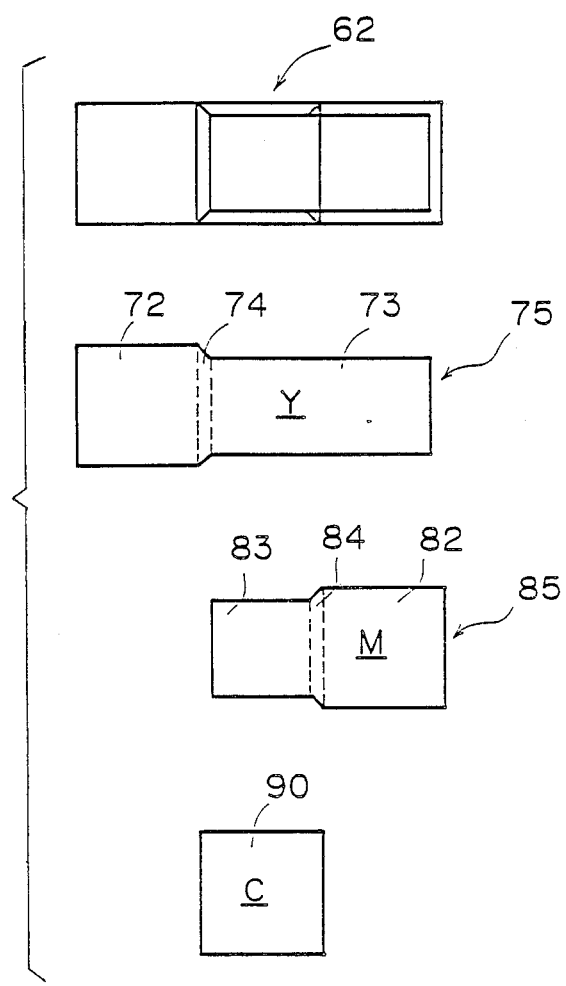

The procedure shown in FIG. 11 is also applicable in a case where a multicolor image is reproduced with three or more print patterns. FIGS. 13A–13C show a procedure of shape modification for a three-color image. A three-color image 60 is divided into three regions 60y, 60ymc and 60yc. The three-color image 60 is reproduced with a first print pattern 70 of yellow color Y, a second print pattern 80 of magenta color M, and a third print pattern 90 of cyan color C. Namely, the region 60y is printed only with the first print pattern 70. The region 60ymc is overprinted with the first through third print patterns 70–90, and the region 60yc is overprinted with the first and third print patterns 70 and 90. Assuming that the densities of cyan, magenta and yellow are one higher than the other in the order presented, overlapping portions of the first and second print pattern 70 and 80 are determined as follows:

$$B_{71} = B_{70} \cdot \{B_{80} + B_{90}\} \quad (5)$$

$$B_{81} = B_{80} \cdot B_{90} \quad (6)$$

where $B_{71}$: binary data of an overlapping portion 71 of the first print pattern 70

$B_{81}$: binary data of an overlapping portion 81 of the second print pattern 80

$B_{70}$, $B_{80}$, $B_{90}$: binary data of the first, second and third print patterns 70, 80 and 90

"·": AND operation

"+": OR operation

The binary data $B_{70}$, $B_{71}$, $B_{80}$, $B_{81}$ and $B_{90}$ are so formed that the values of the binary data are "1" at the inside of respective patterns and portions and "0" at the outside of respective patterns and portions.

As shown in FIG. 13B, the first print pattern 70 is divided into the overlapping portion 71, which is outlined with broken lines, and a residual portion 72. Then, tint pattern data of a reduced overlapping portion 73 is obtained at the step S2, which is already explained in FIGS. 6A–6B and 11.

The second print pattern 80 is also divided into the overlapping portion 81, which is outlined with broken lines, and a residual portion 82. Then, tint pattern data of a reduced overlapping portion 83 is obtained at the step S3.

Further, as shown in FIG. 13C, tint pattern data of linkage portions 74 and 84 are obtained at the step S3, respectively.

As a result, a modified three-color image 62 shown in FIG. 13C is overprinted with a modified first print pattern 75 consisting of the portions 72, 73 and 74, a modified second print pattern 85 consisting of the portions 82, 83 and 84, and the third print pattern 90. As can be seen in FIGS. 13A–13C, the print pattern 90 of the deepest color is not subjected to the shape modification.

According to the present invention, shape modification of print patterns can be easily performed automatically, instead of by manual labor, in order to make registering mismatch inconspicuous.

Further, even if print patterns have complicated shapes, the shape modification can be performed precisely and rapidly. In some cases, only a tenth of the processing time is needed as compared to manual operation.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A method of correcting a set of color patterns for an overprinting process for producing a multicolor print image, said method comprising the step of:

(a) specifying a first color pattern having a first color to be subjected to shape correction and a second color pattern having a second color not requiring shape correction, (b) generating first and second digitized color pattern data expressing respective shapes and colors of said first and second color patterns for each pixel of said color patterns and obtaining from said digitized color pattern data first and second binary image data expressing said respective shapes of said first and second color patterns for each pixel, (c) obtaining a third binary image data on the basis of said first and second binary image data, said third binary image data expressing an overlapping area at which said second color pattern is overlapping with said first color pattern, (d) executing logical processing on said third binary image data to obtain a fourth binary image data expressing a modified overlapping area which is reduced by a prescribed width from said overlapping area, (e) modifying said first digitized color pattern data on the basis of said fourth binary image data to obtain a modified first color pattern data expressing said modified overlapping area with said first color, and (f) replacing said first digitized color pattern data with said modified first color pattern data to obtain a set of modified color pattern data which includes said modified first color pattern data in place of said first color pattern data.

2. A method in accordance with claim 1, wherein said logical processing is performed with a pixel cell consisting of plurality of pixels and including replacing binary data of a central portion of said pixel cell by a result of a logical operation carried out on data in said pixel cell.

3. A method in accordance with claim 2, wherein a value of said third binary image data "1" at the inside of said overlapping area and "0" at the outside of said overlapping area, and said logical operation is performed by conducting an AND operation on binary data of all pixels included in said pixel cell.

4. A method in accordance with claim 3, wherein said step (a) is performed through comparing respective colors of said color patterns with each other to determine a relatively light color for comprising said second color.

5. A method in accordance with claim 3, wherein said step (a) is performed manually to specify said first and second color patterns regardless of relative deepness of color of said first and second colors.

6. A method of correcting a set of color patterns for an overprinting process for producing a multicolor print image, said method comprising the step of:

(a) specifying a first color pattern of said color patterns having a first color to be subjected to shape correction and a second color pattern having a second color not requiring shape correction, (b) generating first and second digitized color pattern data expressing respective shapes and colors of said first and second color patterns for each pixel of said patterns and obtaining from said digitized color pattern data first and second binary image data expressing said respective shapes of said first and second color patterns for each pixel, (c) obtaining third and fourth binary image data on the basis of said first and second binary image data, said third binary image data defining an overlapping area at which said second color pattern overlaps said first color pattern, said fourth binary image data defining a residual area of said first color pattern other than said overlapping area, (d) executing a first type of logical processing on said third binary image data to obtain a fifth binary image data expressing a modified overlapping area which is reduced by a prescribed width from said overlapping area, (e) obtaining a sixth binary image data on the basis of said third and fourth binary image data, said sixth binary image data expressing a linkage area which is positioned between said residual area and said modified overlapping area, (f) modifying said first color pattern data on the basis of said fifth and sixth binary image data to obtain a modified first color pattern data expressing a combination of said residual area, said modified overlapping area and said linkage area with said first color, and (g) replacing said first digitized color pattern data with said modified first color pattern data to obtain a set of modified color pattern data which includes said modified first color pattern data in place of said first color pattern data.

7. A method in accordance with claim 6, wherein said step (e) further comprises the steps of:

(e-1) executing a second type of logical processing on said fourth binary image data to obtain an expanded fourth binary image data expressing an expanded residual area which is expanded all around by a second width from said residual area, (e-2) obtaining a common part binary image data as a part of said sixth binary image data on the basis of said third binary image data and said expanded fourth binary image data, said common part binary image data defining an area which is common to said overlapping area and said expanded residual area, (e-3) executing a third type of logical processing on said third binary image data to obtain a reduced third binary image data expressing a reduced overlapping area which is reduced all around by said second width from said overlapping area, and (e-4) repeating said steps (e-1) through (e-3) N times, where N is an integer, in each repetition said fourth binary image data, said residual area, said third binary image data and said overlapping area replacing said expanded fourth binary image data, said expanded residual area, said reduced third binary image data and said reduced overlapping area, respectively.

8. A method in accordance with claim 7, wherein said second width multiplied by N equals said first width.

9. A method in accordance with claim 8, wherein said first, second and third types of logical processing are performed with respect to a pixel cell containing a plurality of pixels and including replacing the data of a central portion of said pixel cell by a result of a logical operation carried out on said pixel cell.

10. A method in accordance with claim 9, wherein a value of said binary image data is "1" at the inside of said shapes and areas and "0" at the outside of said shapes and areas, and said logical operation in said first and third types of logical processing is an AND operation of the binary data of all pixels included in said pixel cell, and, said logical operation in said second logical processing is an OR operation of all pixels included in said pixel cell.

11. A method in accordance with claim 10, wherein said step (a) is performed by comparing respective colors of said color patterns with each other to determine a relatively light color for selection as said first color and a relatively deep color for comprising said second color.

12. A method in accordance with claim 10, wherein said step (a) is performed manually and regardless of the relative deepness of said first and second colors.

13. A method of correcting a set of color patterns for an overprinting process for producing a multicolor print image, said color patterns having a color border line associated therewith, said method comprising the steps of:

(a) specifying a first color pattern having a first color to be subjected to shape correction and a second color pattern having a second color not requiring shape correction within said color patterns, (b) binarizing first and second color pattern data expressing respective shapes and colors of said first and second color patterns for each pixel to obtain first and second binary image data expressing said respective shapes of said first and second color patterns for each pixel, (c) obtaining third binary image data on the basis of said first and second binary image data, said third binary image data defining an annex area having a width along said border line which decreases from said border line toward a central part of said second color pattern, (d) modifying said first color pattern data on the basis of said third binary image data to obtain a modified first color pattern data defining a combination of said shape of said first color pattern and said annex area with said first color, and (e) replacing said first color pattern data with said modified first color pattern data to obtain a set of modified color pattern data which includes said modified first color pattern data in place of said first color pattern data.

14. A method in accordance with claim 13, wherein said step (c) further comprises the steps of:

(c-1) executing a first type of logical processing on said first binary image data to obtain an expanded first binary image data expressing an expanded first area which is expanded by a prescribed width from an outer perimeter of said first color pattern, (c-2) obtaining a common part binary image data as a part of said third binary image data on the basis of said second binary image data and said expanded first binary image data, said common part binary image data defining an area which is common to said second color pattern and said expanded first area, (c-3) executing a second type of logical processing on said second binary image data to obtain a reduced second binary image data expressing a reduced second area which is reduced by said prescribed width from said outer perimeter of said second color pattern, and (c-4) repeating said steps (c-1) through (c-3) a prescribed number of times, in each repetition said first binary image data, said shape of said first color pattern, said second binary image data and said perimeter of said second color pattern being replaced by said expanded first binary image data, said expanded first area, said reduced second binary image data and said reduced second area, respectively.

15. A method in accordance with claim 14, said first and second types of logical processing being performed with respect to a pixel cell containing a plurality of pixels and including replacing the data of a central portion of said pixel cell by a result of a logical operation carried out on said pixel cell.

16. A method in accordance with claim 15, wherein a value of said binary image data is "1" at the inside of said shapes and areas and "0" at the outside of said shapes and areas, and said logical operation in said first logical processing is an OR operation of the binary data of all pixels included in said pixel cell, and said logical operation in said second logical processing is an AND operation of the binary data of all pixels included in said pixel cell.

17. A method in accordance with claim 16, wherein said step (a) is performed by comparing respective colors of said color patterns with each other to determine a relatively light color for selection as said first color and a relatively deep color for comprising said second color.

18. A method in accordance with claim 10, wherein said step (a) is performed manually and regardless of the relative deepness of said first and second colors.

19. An apparatus for correcting a set of color pattern associated with an overprinting process, said apparatus comprising:

(a) a data converter for digitizing first and second color pattern data defining respective shapes and colors of first and second color patterns within said color patterns to obtain first and second binary image data expressing said respective shapes of said first and second color patterns, (b) a first processor for generating a third binary image data on the basis of said first and second binary image data, said third binary image data defining an overlapping area at which said second color pattern is overlapped with said first color pattern, (c) a second processor for executing logical processing on said third binary image data to obtain a fourth binary image data expressing a modified overlapping area which is reduced by a prescribed width from said overlapping area, and (d) a data editor for modifying said first color pattern data on the basis of said fourth binary image data to obtain a modified first color pattern data expressing said modified overlapping area with said color of said first color pattern.

20. An apparatus for correcting a set of color patterns associated with an overprinting process, said apparatus comprising:

(a) a data converter for digitizing first and second color pattern data defining respective shapes and colors of first and second color patterns within said color patterns to obtain first and second binary image data expressing said respective shapes of said first and second color patterns, (b) a first processor for generating third and fourth binary image data on the basis of said first and second binary image data, said third binary image data defining an overlapping area at which said second color pattern is overlapped with said first color pattern, said fourth binary image data defining a residual area of said first color pattern other than said overlapping area, (c) a second processor for executing logical processing on said third binary image data to obtain a fifth binary image data expressing a modified overlapping area which is reduced by a prescribed width from said overlapping area, (d) a third processor for obtaining a sixth binary image data on the basis of said third and fourth binary image data, said sixth binary image data defining a linkage area which is positioned between said residual area and said modified overlapping area, and (e) a data editor for modifying said first color pattern data on the basis of said fifth and sixth binary image data to obtain a modified first color pattern data expressing a combination of said residual area, said modified overlapping area and said linkage area with said color of said first color pattern.

21. An apparatus for correcting a set of color patterns for an overprinting process for producing a multicolor print image, said color patterns having a border line associated therewith, said apparatus comprising:
   (a) a data converter for digitizing first and second color pattern data expressing respective shapes and colors of first and second color patterns within said color patterns to obtain first and second binary image data expressing said respective shapes of said first and second color patterns,
   (b) a data processor for obtaining a third binary image data on the basis of said first and second binary image data, said third binary image data defining an annex area having a width along said border line which decreases from said border line toward a central part of said second color pattern,
   (c) a data editor for modifying said first color pattern data on the basis of said third binary image data to obtain a modified first color pattern data expressing a combination of said shape of said first color pattern and said annex area with said color of said first color pattern.

22. A method in accordance with claim 1, wherein the step of executing of said logical processing is effective to reduce said overlapping area all around to obtain said modified overlapping area.

23. A method in accordance with claim 6, wherein the step of executing the first type of logical processing is effective to reduce said overlapping area all around to obtain said modified overlapping area.

24. A method in accordance with claim 14, wherein said step of executing the first type of logical processing comprises obtaining said expanded first binary image data such as to define the expanded first area which is expanded all around relatively to said perimeter of said first color pattern.

25. A method in accordance with claim 24, wherein said execution of said second type of logical processing results in said reduced second area and including reducing said second area all around relative to said outer perimeter of said second color pattern.

26. An apparatus in accordance with claim 19, wherein said modified overlapping area is reduced all around relative to said overlapping area.

27. An apparatus in accordance with claim 20, wherein said modified overlapping area is reduced all around relative to said overlapping area.

* * * * *